(12) United States Patent
Mackinnon, III et al.

(10) Patent No.: US 12,551,647 B2
(45) Date of Patent: Feb. 17, 2026

(54) RESTING BLOCK AND ADJUSTABLE LOCKING MECHANISM FOR SAME

(71) Applicant: Surgicure Technologies, Inc., Charlestown, MA (US)

(72) Inventors: Robert Bruce Mackinnon, III, Carver, MA (US); Irena King, Charlestown, MA (US)

(73) Assignee: Surgicure Technologies, Inc., Charlestown, MA (US)

( * ) Notice: Subject to any disclaimer, the term of this patent is extended or adjusted under 35 U.S.C. 154(b) by 0 days.

(21) Appl. No.: 18/198,806

(22) Filed: May 17, 2023

(65) Prior Publication Data

US 2023/0372653 A1 Nov. 23, 2023

Related U.S. Application Data

(60) Provisional application No. 63/342,941, filed on May 17, 2022.

(51) Int. Cl.
*A61M 16/04* (2006.01)
(52) U.S. Cl.
CPC .... *A61M 16/0497* (2013.01); *A61M 16/0493* (2014.02)
(58) Field of Classification Search
CPC ........ A61M 16/0497; A61M 2025/022; A61M 2025/024; A61M 16/0493
See application file for complete search history.

(56) References Cited

U.S. PATENT DOCUMENTS

| 2,749,196 | A | * | 6/1956 | Wolfe | A47B 23/025 |
| | | | | | 248/228.3 |
| 3,927,676 | A | | 12/1975 | Schultz | |
| 4,141,524 | A | * | 2/1979 | Corvese, Jr. | A61G 7/0503 |
| | | | | | 5/503.1 |
| 4,326,515 | A | | 4/1982 | Shaffer et al. | |
| 4,449,527 | A | * | 5/1984 | Hinton | A61M 16/0488 |
| | | | | | 128/DIG. 26 |
| 4,658,814 | A | | 4/1987 | Anderson | |
| 4,867,154 | A | | 9/1989 | Potter et al. | |
| 5,146,913 | A | | 9/1992 | Khorsandian et al. | |
| 5,263,478 | A | | 11/1993 | Davis | |
| 5,345,931 | A | * | 9/1994 | Battaglia, Jr. | A61M 25/02 |
| | | | | | 604/179 |
| 5,398,679 | A | | 3/1995 | Freed | |
| 5,402,776 | A | | 4/1995 | Islava | |
| 5,490,504 | A | * | 2/1996 | Vrona | A61M 16/0488 |
| | | | | | 128/207.14 |

(Continued)

FOREIGN PATENT DOCUMENTS

| CN | 201186094 Y | 1/2009 |
| CN | 208611537 U | 3/2019 |

(Continued)

*Primary Examiner* — Kathryn E Ditmer
(74) *Attorney, Agent, or Firm* — Goodwin Procter LLP (57) ABSTRACT

The present disclosure relates to a device that in some embodiments can be used to securely fasten a medical device (e.g. an endotracheal tube) in position for use by a patient. In various embodiments, the device can include a frame and an adjustable locking mechanism slidably connected to the frame. The adjustable locking mechanism can feature a cylindrical block, a swivel lock portion, and an adjustable clip.

9 Claims, 8 Drawing Sheets

(56) References Cited

U.S. PATENT DOCUMENTS

| | | | |
|---|---|---|---|
| 5,551,421 A | 9/1996 | Noureldin et al. | |
| 5,829,430 A | 11/1998 | Islava | |
| 6,067,985 A | 5/2000 | Islava | |
| 6,321,749 B1 | 11/2001 | Toti et al. | |
| 6,796,310 B2 | 9/2004 | Bierman | |
| 7,234,619 B2* | 6/2007 | Hicks | B60R 7/046 |
| | | | 224/543 |
| 7,628,154 B2 | 12/2009 | Bierman et al. | |
| 8,256,427 B2 | 9/2012 | Chang et al. | |
| 8,382,665 B1 | 2/2013 | Fam | |
| 8,726,903 B2 | 5/2014 | Levine | |
| 8,978,656 B2* | 3/2015 | Chien | A61M 16/0683 |
| | | | 128/207.11 |
| 11,058,837 B2 | 7/2021 | Stam et al. | |
| 11,406,780 B2 | 8/2022 | Landis et al. | |
| 11,612,710 B2 | 3/2023 | Jockel et al. | |
| 2008/0092901 A1 | 4/2008 | Kang | |
| 2010/0083970 A1* | 4/2010 | Beely | A61M 16/0493 |
| | | | 128/207.14 |
| 2010/0154800 A1 | 6/2010 | Chang et al. | |
| 2010/0180900 A1 | 7/2010 | Talsma et al. | |
| 2012/0168571 A1* | 7/2012 | Bond | A61M 25/02 |
| | | | 248/70 |
| 2014/0120494 A1* | 5/2014 | Chin | A61C 11/08 |
| | | | 433/55 |
| 2015/0209209 A1 | 7/2015 | Dawson | |
| 2016/0095995 A1 | 4/2016 | Haider et al. | |
| 2016/0235935 A1 | 8/2016 | Mirza et al. | |
| 2017/0173287 A1 | 6/2017 | Kotzian | |
| 2019/0381267 A1 | 12/2019 | De Oliveira et al. | |
| 2022/0331536 A1 | 10/2022 | Russo et al. | |

FOREIGN PATENT DOCUMENTS

| | | | | |
|---|---|---|---|---|
| CN | 210750747 U | | 6/2020 | |
| CN | 111408002 A | | 7/2020 | |
| CN | 212593392 U | | 2/2021 | |
| EP | 2745867 A1 | * | 6/2014 | ........ A61M 16/0497 |
| IN | 2009MU02719 | | 1/2009 | |
| JP | H0492437 U | * | 8/1992 | |
| TW | 201728351 A | | 8/2017 | |
| WO | 200480518 A1 | | 9/2004 | |
| WO | WO-2010/033109 A1 | | 3/2010 | |
| WO | WO-2011/159997 A1 | | 12/2011 | |
| WO | WO-2014/144656 A1 | | 9/2014 | |
| WO | WO-2021/050865 A1 | | 3/2021 | |
| WO | WO-2022/094353 A1 | | 5/2022 | |

* cited by examiner

RESTING BLOCK AND ADJUSTABLE LOCKING MECHANISM FOR SAME

CROSS-REFERENCE TO RELATED APPLICATIONS

This application claims priority to and the benefit of co-pending U.S. provisional patent application Ser. No. 63/342,941, titled "Resting Block and Adjustable Locking Mechanism for Same" filed on May 17, 2022, the disclosure of which is herein incorporated by reference in its entirety.

BACKGROUND OF THE INVENTION

Figure 6:
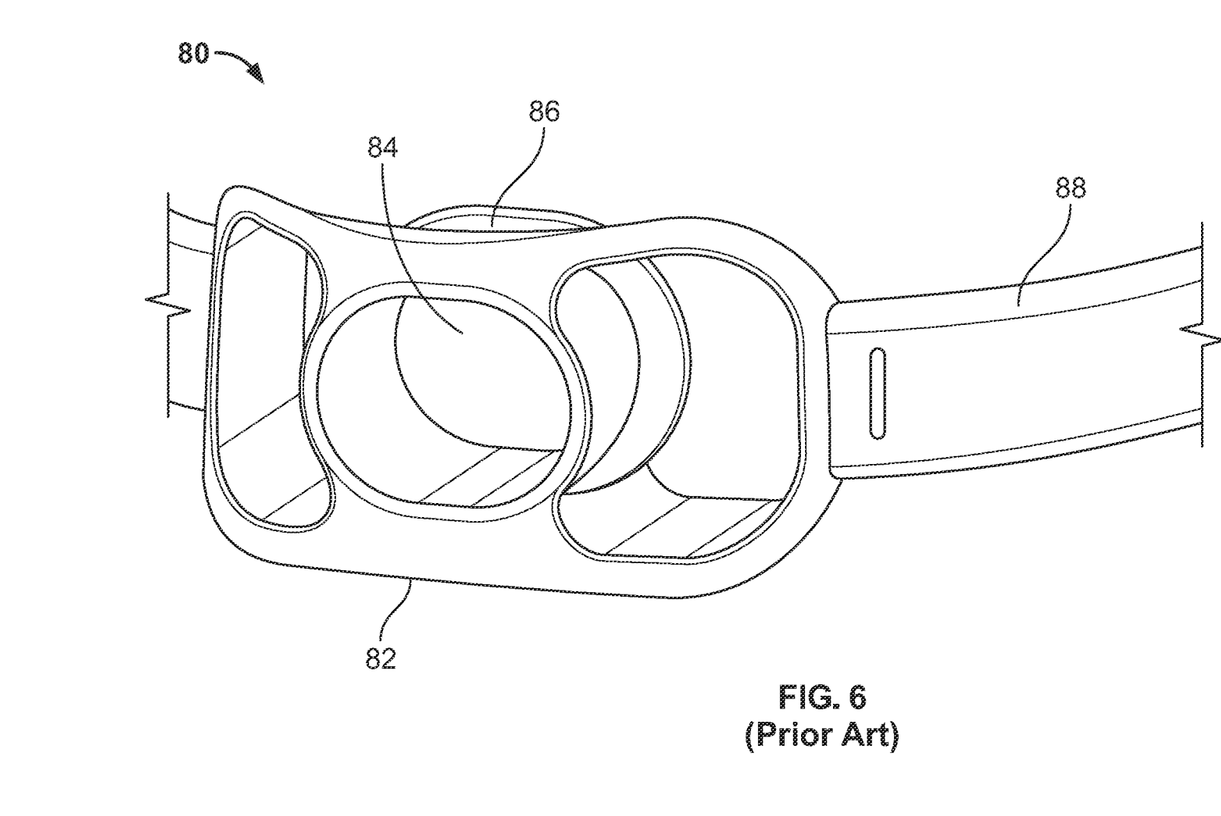
FIG. 6 shows a first embodiment of an endotracheal tube holder in accordance with the prior art.

The global outbreak of the coronavirus, as well as other medical emergencies, has necessitated the use of intubation to ensure patients receive sufficient oxygen. As is well known to the art, intubation requires positioning a distal end or tip of an endotracheal tube (ETT) in the patient's trachea and ensuring that the distal end or tip of the ETT remains at that location. Referring to FIG. 6, a first embodiment of a conventional system 80 includes (e.g., loosely) inserting the ETT in an endotracheal tube holder 82 that serves a number of purposes. In some embodiments, the endotracheal tube holder 82 includes a (semi-rigid, plastic) frame 86 that prevents the patient from biting her tongue, cheek, and/or lips, as well as from biting the ETT and occluding or otherwise compromising the airflow through the ETT.

Figure 7:
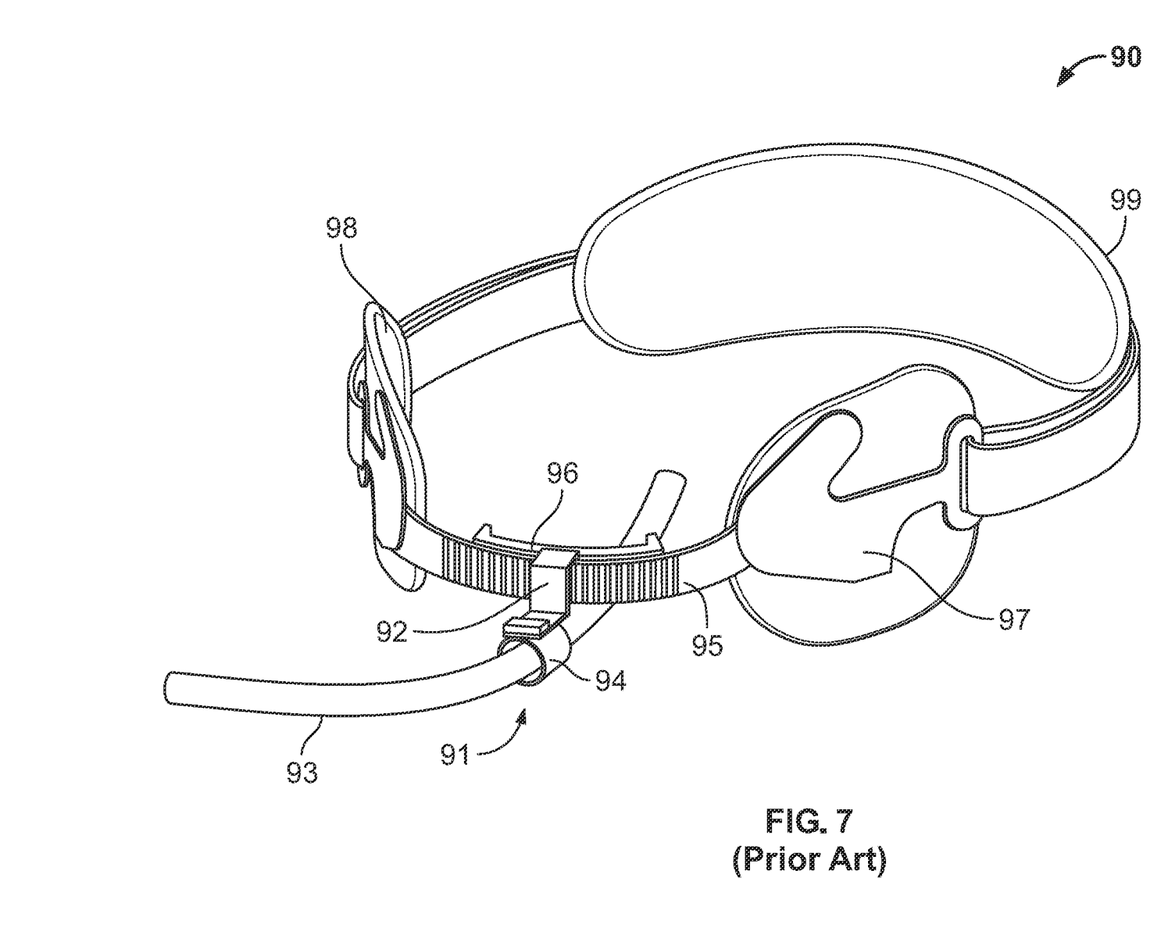
FIG. 7 shows a second embodiment of an endotracheal tube holder in accordance with the prior art.

Referring to FIG. 7, a second embodiment of a conventional endotracheal tube holder 90 is shown. The embodied endotracheal tube holder 90 may include a radial track portion 95 to which a positioning/securing device 91 is slidingly and removably attached. The positioning/securing device 91 is adapted to slidingly traverse the radial track portion 95 so as to position the ETT securing portion 94 at a desired location. The positioning/securing device 91 may include a locking mechanism 92 for securing the device at the desired location on the radial track portion 95 as well as an ETT securing portion 94 that is configured to secure the ETT. In some variations, the ETT may be inserted in the securing portion 94 and a strap 93 may be passed around the outer circumference of the ETT and used to secure it the positioning/securing device 91. A comfort pad 96 may be disposed on the inner side of the radial track portion 95.

Much of such conventional systems 90 often is structured and arranged to remain outside of the patient's mouth. For example, in addition to the radial track portion 95, comfort pad 96, and positioning/securing device 91 remaining outside of the patient's mouth, a pair of wings 97, to which an adjustable head strap 99 may be attached, typically, is formed with or attached to the radial track portion 95. Each wing 97 includes a cheek pad 98 that is structured and arranged to rest on the patient's cheeks and to protect the patient's cheeks from irritation due to the wings 97. Problematically, the cheek pads 98 themselves may cause discomfort to the patient's cheeks. Furthermore, conventional locking features loosen with time. Hence, the positioning of the distal end of the ETT may be deleteriously compromised. Finally, the embodied endotracheal tube holder 90 does not include a bite block that is inserted in the patient's mouth to keep the patient's mouth open and to prevent the patient from biting herself or occluding the ETT.

SUMMARY OF THE INVENTION

Accordingly, it would be desirable to provide a device for reliably securing an ETT at a desired position and depth within the patient's trachea.

In general, one aspect of the present invention features a device for securely fastening an elongate device to prevent movement. The device can include a frame that includes a radial tracking portion and an adjustable locking mechanism slidably connected to the radial tracking portion.

In various embodiments, the radial tracking portion can include alternating teeth and gaps therebetween. The frame can also include a pair of elongate arms, each of which is fixedly attached to the radial tracking portion and/or a bite block disposed at a distal end of the frame. The bite block can be formed of a softer material (e.g., a semi-rigid polymer) than the frame. In some embodiments, the elongate device is an endotracheal tube (e.g., having a diameter in a range from 2 mm to 12 mm).

In general, another aspect of the invention features an adjustable locking mechanism that include an adjustable clamp, a swivel lock portion, and an adjustable clip attached to the swivel lock portion for restraining an object.

In various embodiments, the adjustable clamp can include a block disposed at a proximal end thereof. The block can feature a pair of protrusions for containing a radial track having teeth and corresponding gaps therebetween, and a connection portion disposed at a distal end of the block. In some embodiments, the adjustable clamp can also include a disk-shaped portion disposed between the block and the connection portion. In some cases, the block has a cylindrical shape. In some cases, the pair of protrusions are L-shaped. The swivel lock portion can include a rotatable substrate, a hollow portion disposed at one end of the rotatable substrate, and a protrusion disposed on the hollow portion and adapted to prevent the swivel lock portion from moving when inserted into a gap between adjacent teeth of a radial track. In some cases, the hollow portion comprises a cylindrical shape. The object can be an endotracheal tube (e.g., having a diameter in a range from 2 mm to 12 mm).

In general, another aspect of the invention features a method of securely fastening an elongate device to a user. The method can include the steps of securing a frame comprising a radial tracking portion about a head of a user, sliding an adjustable locking mechanism along the radial tracking portion to a desired location, and locking the elongate device in place using the adjustable locking mechanism.

In various embodiments, the desired location is proximate the user's mouth, such that the elongate device can be advantageously inserted into the user's mouth. The elongate device can be an endotracheal tube.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1A:
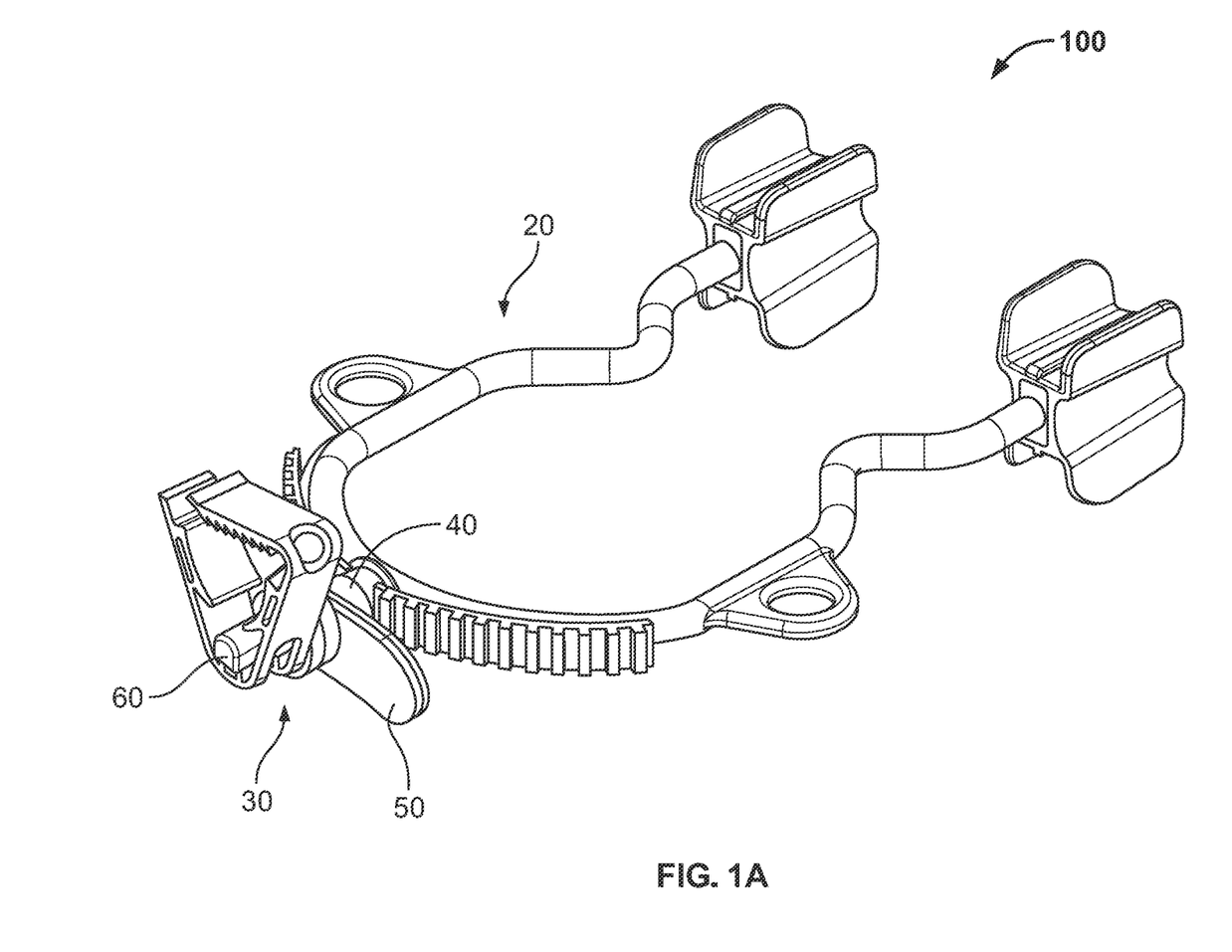
FIGS. 1A and 1B, respectively, show front and rear perspective views of a resting block, in accordance with some embodiments of the present invention.
Figure 1B:
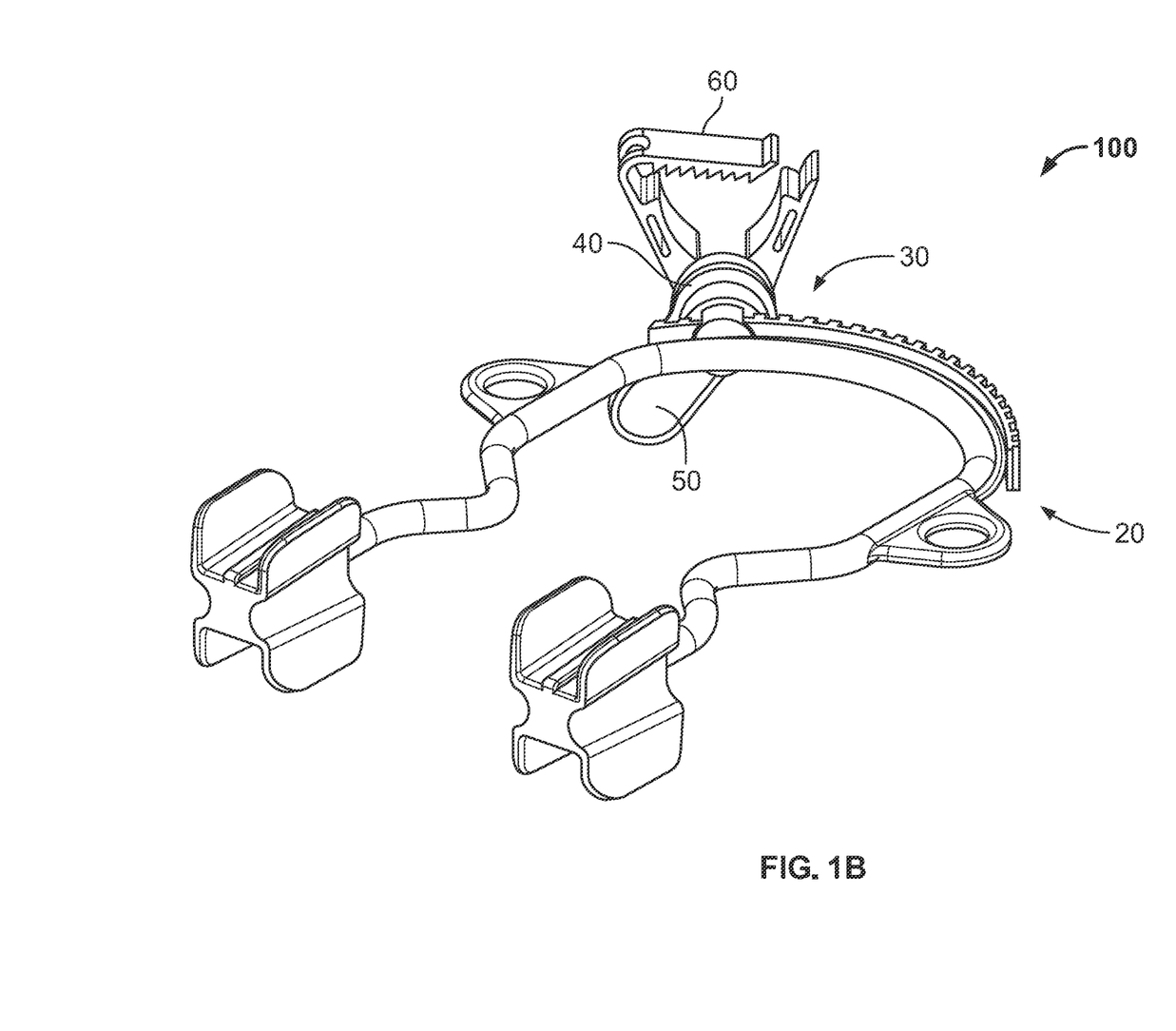

Referring to FIGS. 1A and 1B, an embodiment of an (e.g., disposable, non-reusable) endotracheal tube holder—henceforth referred to as a resting block (RB) 100—for use in conjunction with an intubation procedure is shown. Such intubation procedures may be used for surgical procedures or may be used by intensive care units (ICUs), trauma/burn units, and the like. In some implementations, the RB 100 may be structured and arranged to facilitate positioning an (e.g., 2 mm to 12 mm diameter) ETT 10 that has been properly inserted into an adult (i.e., age 18 and older) patient's trachea. Advantageously, the RB 100 is adapted to hold the ETT 10 in a secure position to prevent the ETT 10 from shifting position. Although the invention is described for a specific medical use to secure an ETT 10 at a desired location in a patient's airway, those of ordinary skill in the art can appreciate that the concepts taught may be applied to other arts to include, for the purpose of illustration rather than limitation, securely fixing the locations of a cable, a rod, a hose, and the like.

In some applications, the RB 100 may include a support frame 20 in combination with an adjustable locking mechanism 30. Advantageously, the support frame 20 includes a pair of (e.g., soft) bite blocks 25 that are configured to prevent the patient from biting herself (e.g., her tongue, lips, and/or cheek) or occluding the (e.g., 2 to 12 mm diameter) ETT 10.

Frame and Bite Blocks

Figure 2:
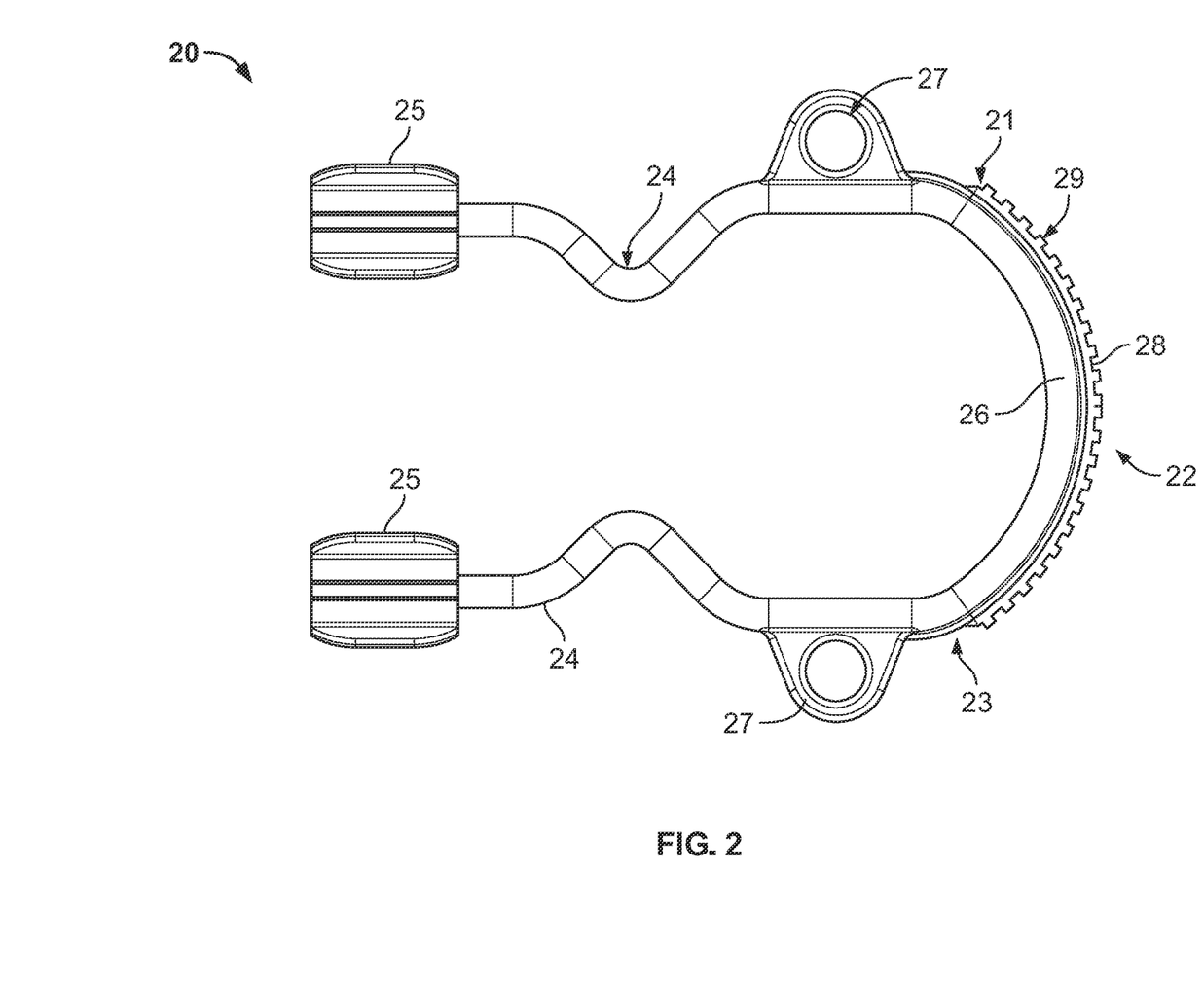
FIG. 2 shows a plan (top) view of a frame for the resting block of FIGS. 1A and 1B, in accordance with some embodiments of the present invention.
Figure 3A:
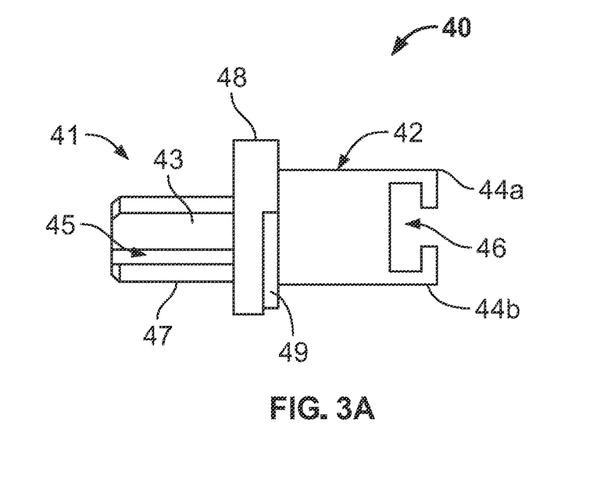
FIG. 3A shows a side view of an adjustable clamp, in accordance with some embodiments of the present invention.
Figure 3B:
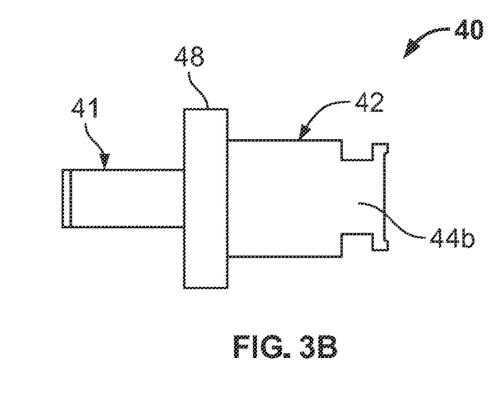
FIG. 3B shows a plan (top) view of the adjustable clamp shown in FIG. 3A, in accordance with some embodiments of the present invention.
Figure 3C:
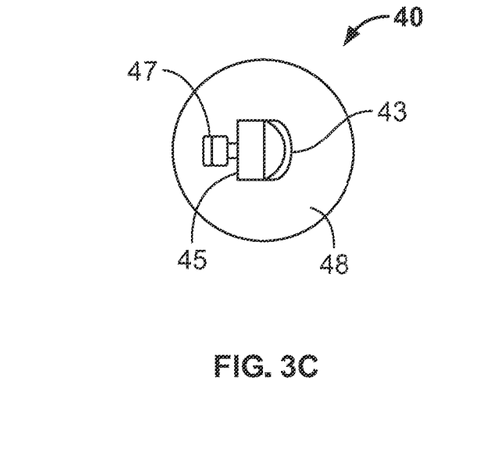
FIG. 3C shows an end-on view of a block portion of the adjustable clamp shown in FIG. 3A, in accordance with some embodiments of the present invention.
Figure 3D:
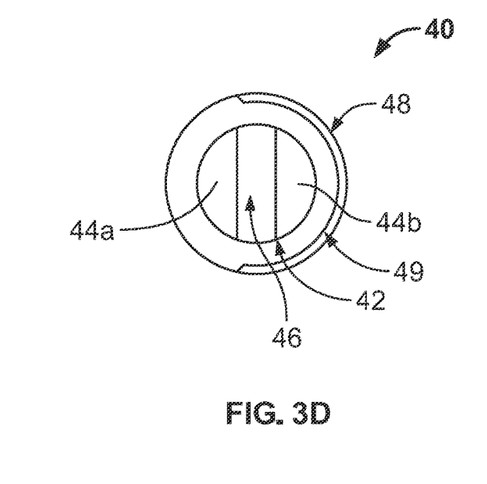
FIG. 3D shows an end-on view of a connection portion of the adjustable clamp shown in FIG. 3A, in accordance with some embodiments of the present invention.

As shown in FIG. 2, in some embodiments, the support frame 20 may be structured and arranged to include a (e.g., curvilinear or arcuate) radial track portion 22. The length of the frame may be about 3.9 inches (+/−0.05) long with a frame diameter of about 0.19 (+/−0.05) inches. In some variations, the support frame 20 may be structured and arranged to support the weight of the ETT 10. In some variations, the support frame 20 may be constructed of a (e.g., semi-rigid, plastic) material such as a polyamide or nylon (e.g., Nylon® 66, Zytel® 101L NC010 (Natural), and so forth), injection-molded polymers, a wire sheathed in polyvinyl chloride, and the like. Alternatively, in some implementations, the support frame 20 may be manufactured of metal, rubber, or the like. Preferably, the support frame 20 may be made of a biodegradable material, such as wood.

A pair of (e.g., elongate) arms 24 may be formed with and/or fixedly attached to the radial track portion 22, for example at or near each of a distal end 21 and a proximal end 23 of the radial track portion 22. The pair of (e.g., elongate) arms 24 may be configured to be compressed towards one another to facilitate inserting the (e.g., elongate) arms 24 into the patient's mouth. In some variations protrusions 27 may be formed on each of the (e.g., elongate) arms 24 for attaching ties, straps, and the like to prevent patient's from extubating themselves. The pair of (e.g., elongate) arms 24 may also be constructed of a (e.g., semi-rigid, plastic) material such as a polyamide or nylon (e.g., Nylon® 66, Zytel® 101L NC010 (Natural), and so forth), injection-molded polymers, a wire sheathed in polyvinyl chloride, and the like.

Advantageously, in some variations, a bite block 25 may be fixedly attached at the distal ends of each of the arms 24. For patient comfort, the bite blocks 25 are structured and arranged to be softer than the support frame 20; but resistant to being bitten off by the patient. Typical bite block length and width may be about 0.88 (+/−0.05) inches and 0.69 (+/−0.05) inches, respectively. The distance between the bite blocks should be about 2.38 (+/−0.05) inches. In some implementations, the bite block 25 may be manufactured of a (e.g., soft) rubber, a thermoplastic elastomer (e.g., Versaflex® 6258-1 (Natural)), or (e.g., a plastic or semi-rigid) polymer, such as a homopolymer or a polypropylene copolymer (PPC), which is softer but more resilient and resistant to stress cracking than a homopolymer. In some variations, the semi-rigid polymers may have a shore-A durometer hardness greater than 50. Advantageously, use of PPC is preferable to a homopolymer in the event the device were subject to gamma or steam sterilized for reuse.

The pair of (e.g., soft) bite blocks are structured and arranged to fit comfortably atop the patient's wisdom teeth and/or rearmost molars. Advantageously, the resting block does not include cheek pads, which prevents facial and/or oral ulcers.

In some implementations, the radial track portion 22 is structured and arranged to include a flanged portion 26 on an outer peripheral surface of which a plurality of teeth 29 and a corresponding plurality of gaps 28 are formed. In some variations, the flanged portion 26 extends from the distal end 21 of the radial track portion 22 to the proximal end 23. Optionally, walls may be formed at the distal 21 and proximal ends 23 of the radial track portion 22 to prevent the adjustable locking mechanism 30 from coming off of the flanged portion 26. Advantageously, the teeth 29 and gaps 28 are structured and arranged to cooperate with the adjustable locking mechanism 30 to fixedly and securely attach the adjustable locking mechanism 30 to the radial track portion 22 and, consequently, to secure the ETT 10 at a desired position.

As shown in FIG. 2, in some embodiments, the adjustable locking mechanism 30 is structured and arranged to include at least three elements: an adjustable clamp 40, a lever portion 50, and an adjustable (e.g., ETT) clip 60. Exemplary dimensions for the adjustable locking mechanism 30 include height of approximately 0.28 (+/−0.05) inches and a base length of approximately 2.63 inches (+/−0.05).

Adjustable Clamp

Referring to FIGS. 3A-3D, an exemplary embodiment of an adjustable clamp 40 is shown. In some embodiments, the (e.g., monolithic) adjustable clamp 40 is structured and arranged to fit on the flanged portion 26 of the radial track portion 22 in a sliding and lockable arrangement. In some applications, a (e.g., cylindrically-shaped) proximal portion is configured to include a (e.g., cylindrical) block portion 42 that is dimensioned to slidingly fit into a conduit 54 in the lever portion 50. A pair of (e.g., opposing) L-shaped arms 44a, 44b may be formed at the proximal end of the (e.g., cylindrical) block portion 42, leaving a plenum space 46 that is configured to accommodate the flanged portion 26. In some variations, a first (e.g., upper) L-shaped protrusion or arm 44a rests on or runs along a first (e.g., upper) portion of the flanged portion 26 and a (e.g., diametrically opposing) second (e.g., lower) L-shaped protrusion or arm 44b rests on or runs along a second (e.g., lower) portion of the flanged portion 26.

A (e.g., disk-shaped) middle portion 48 is joined to the (e.g., cylindrical) block portion 42 at the distal end thereof. In some applications, the (e.g., disk-shaped) middle portion 48 has a larger outer diameter than the (e.g., cylindrical) block portion 42. Moreover, the (e.g., disk-shaped) middle portion 48 is structured and arranged to include a shelf 49 (the purpose of which is described in greater detail below) that is formed proximate the distal end of the (e.g., cylindrical) block portion 42.

A connection portion 41 for (e.g., securely and removably) attaching the adjustable clip 50 to the adjustable clamp 40 may be formed on the opposing side of the (e.g., disk-shaped) middle portion 48. In some implementations, the connection portion 41 may include a first post 43 and a second post 47 that define an opening or gap 45 therebetween. The width of the opening or gap 45 is dimensioned to provide a tight, interference fit with the swivel lock portion 50.

Swivel Lock Portion

Figure 4A:
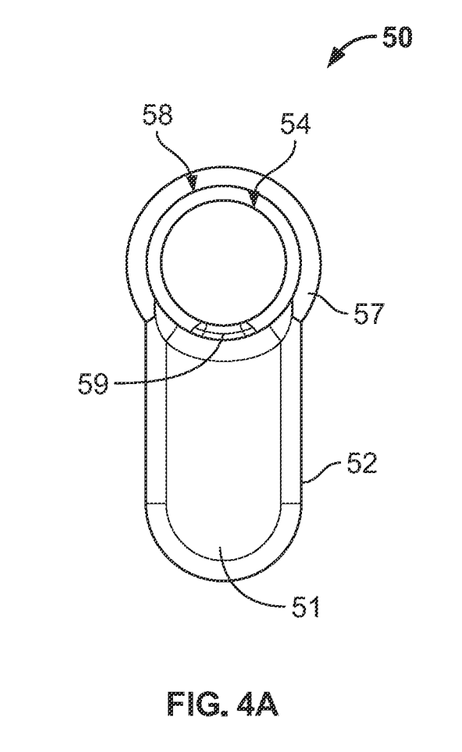
FIG. 4A shows a plan (top) view of a first side of a swivel lock portion, in accordance with some embodiments of the present invention.
Figure 4B:
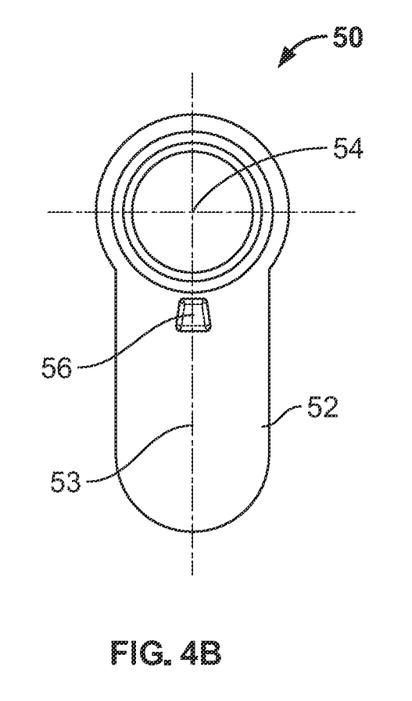
FIG. 4B shows a plan (top) view of an opposing, second side of the swivel lock portion of FIG. 4A, in accordance with some embodiments of the present invention.
Figure 4C:
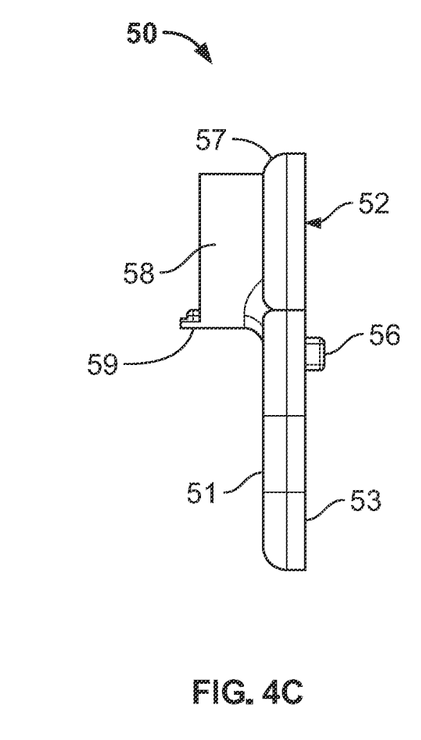
FIG. 4C shows a side view of the swivel lock portion of FIG. 4A, in accordance with some embodiments of the present invention.

Referring to FIGS. 4A-4C, an exemplary embodiment of a swivel lock portion 50 for activating and releasing the adjustable clamp 40 of the adjustable locking mechanism 30 is shown. In some applications, the swivel lock portion 50 includes a (e.g., oval-shaped) substrate 52 having a first or upper surface 51 and a second or lower surface 53. An (e.g., hollow, cylindrical) annular portion 58 having a (e.g., circular) conduit 54 extending through the substrate 52 to the second or lower surface 53 may be formed at one end of the first or upper surface 51. A beveled or rounded portion 57 may be formed about the peripheral edge of the substrate 52 at the end.

The (e.g., circular) conduit 54 should be dimensioned to provide a tight, sliding and rotatable fit with the (e.g., cylindrical) block portion 42, such that, when the (e.g., cylindrical) block portion 42 is inserted into the conduit 54, the swivel lock portion 50 may be rotated about 180 degrees. A protrusion 59 for locking the adjustable locking mechanism 30 to the radial track portion 22 may be formed on the (e.g., cylindrical) annular portion 58. In some variations, the protrusion 59 is dimensioned such, when the protrusion 59 is rotated into the gap 28 between adjacent teeth 29, the thickness of the protrusion 59 will form a tight, interference fit with the teeth 29.

A second protrusion 56 may be formed on the second or lower surface 53 of the substrate 52 proximate the (e.g., circular) conduit 54. The second protrusion 56 is structured and arranged to abut the (e.g., disk-shaped) middle portion 48 of the adjustable clamp 40 and, more particularly, to contact and run along the shelf 49 of the (e.g., disk-shaped) middle portion 48 of the adjustable clamp 40. In operation, the second protrusion 56 restricts and limits the range that the swivel lock portion 50 can be rotated from the "unlocked" position.

Adjustable Clip

Referring to FIGS. 5A-5D, an exemplary embodiment of an adjustable (e.g. EET) clip 60 for retaining and securing the EET 10 is shown. In some implementations, the adjustable (e.g. EET) clip 60 may have a rounded triangular shape having three sides 62, 64, 66 whose lengths may vary, respectively, from about 1.2 inches to about 0.9 to about 1.1 inches. To provide flexibility at or near the corners of the adjustable (e.g. EET) clip 60, portions 61a, 61b, 61c of the sides 62, 64, 66 may be removed. Although the figures show that the removed portions 61a, 61b, 61c are oval or elliptical in shape, this is done for illustrative purposes only. Those skilled in the art can appreciate that other shapes may be used.

In some applications, two of the sides 62, 64 include grips 63a, 63b that are configured to accommodate and apply a compressive force against the ETT 10 to secure the ETT 10 in the adjustable (e.g. EET) clip 60. An attaching device 68 may be formed at the point of juncture between these two sides 62, 64. In some variations, the attaching device 68 may include a pair of L-shaped projections 67 between which is an opening 69. The attaching device 68 may be structured and arranged to form a tight, interference fit within the gap 45 defined between the first post 43 and the second post 47 of the connection portion 41.

In some implementations, the third side 66 and the second side 64 meet at a point of juncture, whereas there is an opening 70 between the third side 66 and the first side 62. In order to close the opening 70 and to compress the ETT 10 within the adjustable (e.g. EET) clip 60, a series of (e.g., serrated) teeth 65 may be formed on the third side 66 and a tip portion 71 may be formed on the first side 62. In operation, once the EET 10 has been inserted inside the adjustable (e.g. EET) clip 60 proximate the pair of grips 63a, 63b and a compressive force is applied to the first 62 and second sides 64 of the adjustable (e.g. EET) clip 60, the opening 70 closes and the (e.g., serrated) teeth 65 are caused to run over the tip portion 71. When the EET 10 is properly secured, the compressive force may be discontinued, leaving the tip portion 71 properly engage with one of the (e.g., serrated) teeth 65, fixedly securing the third side 66 to the first side 62 and, moreover, securing the EET 10 within the adjustable (e.g. EET) clip 60.

When used by a medical professional(s), once the ETT 10 has been properly inserted through the patient's mouth into the patient's airway and positioned at a desired depth within the patient's trachea, the arms 24 of the (semi-rigid, plastic) frame 20 may be compressed towards each other and the arms 24 inserted into the patient's mouth. The medical professional then positions the bite blocks 25, such that the bite blocks 25 are aligned with the patient's wisdom teeth or rearmost molars. Once the bite blocks 25 are properly aligned, the compressive force on the arms 24 of the frame 20 may be removed, causing the arms 24 to return to their original position (e.g., elastically or elasto-plastically).

The medical professional may then secure the ETT 10 to the adjustable locking mechanism 30 located on the radial tracking portion 22 of the (semi-rigid, plastic) frame 20. For example, in some applications, the swivel lock portion 50 of the adjustable locking mechanism 30 may be rotated (e.g., downward) approximately 90 degrees to disengage the locking feature of the adjustable locking mechanism 30. Once disengaged, the adjustable locking mechanism 30 may be moved along the radial track portion 22 until the adjustable locking mechanism 30 is aligned with a proximal end of the ETT 10. Advantageously, moving the adjustable locking mechanism 30 along the radial track portion 22 may occur seamlessly, traveling from a proximal end 21 to a distal end 23 or from a distal end 23 to a proximal end 12.

Figure 5A:
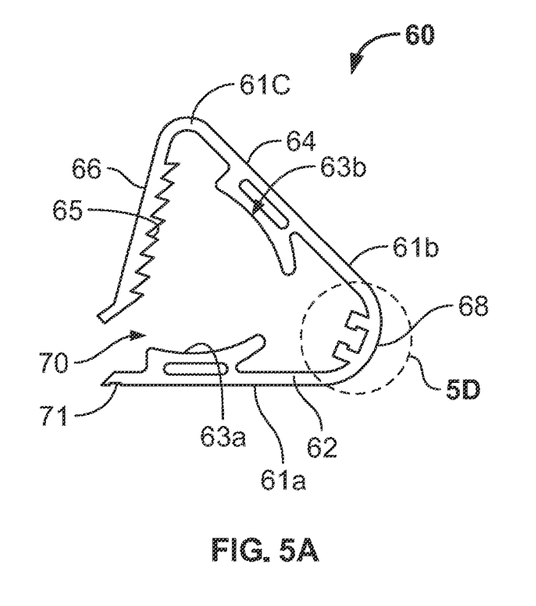
FIG. 5A shows a plan (top) view of an adjustable clip, in accordance with some embodiments of the present invention.
Figure 5B:
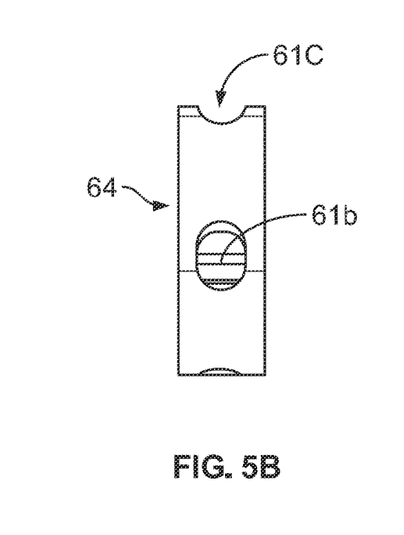
FIG. 5B shows a side view of a second side of the adjustable clip of FIG. 5A, in accordance with some embodiments of the present invention.
Figure 5C:
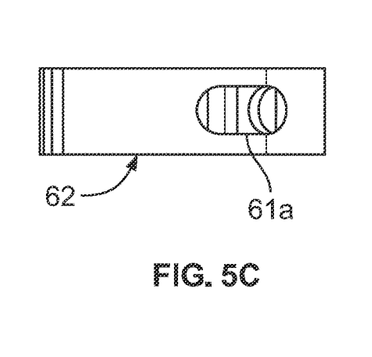
FIG. 5C shows a side view of a first side of the adjustable clip of FIG. 5A, in accordance with some embodiments of the present invention.
Figure 5D:
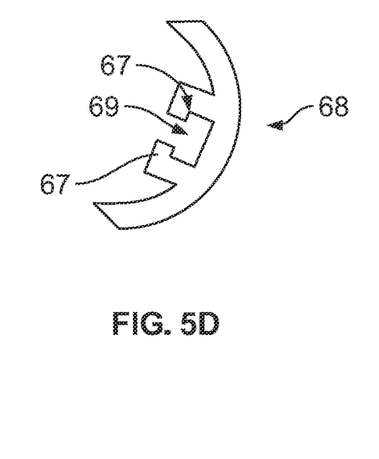
FIG. 5D shows a detail of a point of juncture between the first side of FIG. 5C and the second side of FIG. 5B, in accordance with some embodiments of the present invention.

The medical professional may then carefully insert (e.g., slide) the ETT 10 into the locking feature (e.g., the adjustable clip 60) and compress the first 62 and second sides 64 of the adjustable clip 60 to compress the ETT 10 between the grips 63a, 63b. Once secured, the swivel lock portion 50 of the adjustable locking mechanism 30 may be rotated (e.g., upward) approximately 90 degrees to re-engage the locking feature of the adjustable locking mechanism 30.

Finally, the medical profession may adjust the location of the adjustable locking mechanism 30 and its positioning along the radial tracking portion 22. Advantageously, lateral adjustments to the adjustable locking mechanism 30 enable the medical professional to position the ETT 10 to accommodate the orientation of the patient.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Insert Each numerical value presented herein is contemplated to represent a minimum value or a maximum value in a range for a corresponding parameter. Accordingly, when added to the claims, the numerical value provides express support for claiming the range, which may lie above or below the numerical value, in accordance with the teachings herein. Every value between the minimum value and the maximum value within each numerical range presented herein (including in the charts shown in the figures), is contemplated and expressly supported herein, subject to the number of significant digits expressed in each particular range. Absent express inclusion in the claims, each numerical value presented herein is not to be considered limiting in any regard.

Unless expressly described elsewhere in this application, as used herein, when the term "substantially" or "about" is before a quantitative value, the present disclosure also includes the specific quantitative value itself, as well as, in various cases, a ±1%, ±2%, ±5%, and/or ±10% variation from the nominal value unless otherwise indicated or inferred.

Having described herein illustrative embodiments, persons of ordinary skill in the art will appreciate various other features and advantages of the invention apart from those specifically described above. It should therefore be understood that the foregoing is only illustrative of the principles of the invention, and that various modifications and additions, as well as all combinations and permutations of the various elements and components recited herein, can be made by those skilled in the art without departing from the spirit and scope of the invention. Accordingly, the appended claims shall not be limited by the particular features that have been shown and described, but shall be construed also to cover any obvious modifications and equivalents thereof.

What is claimed is:

1. A device for securely fastening an endotracheal tube to prevent movement, the device comprising:
    a frame comprising a radial tracking portion; and
    an adjustable locking mechanism slidably connected to the radial tracking portion, the adjustable locking mechanism comprising:
        a swivel lock portion comprising a rotatable lever comprising a protrusion couplable with a gap of the radial tracking portion, wherein rotation of the rotatable lever rotates the protrusion of the swivel lock portion into the gap of the radial tracking portion to lock the adjustable locking mechanism relative to the frame; and
        an adjustable clip couplable to the swivel lock portion, wherein the adjustable clip is configured to secure and retain the endotracheal tube, wherein the adjustable clip comprises a tip portion and at least one surface comprising a plurality of teeth, wherein the tip portion is configured to couple with the plurality of teeth so as to fixedly secure the endotracheal tube to the adjustable clip.

2. The device of claim 1, wherein the radial tracking portion comprises a plurality of alternating teeth and gaps therebetween.

3. The device of claim 1, wherein the frame further comprises a pair of elongate arms, each of which is fixedly attached to the radial tracking portion.

4. The device of claim 1, further comprising a bite block disposed at a distal end of the frame.

5. The device of claim 4, wherein the bite block is formed of a softer material than the frame.

6. The device of claim 5, wherein the softer material comprises a semi-rigid polymer.

7. The device of claim 1, wherein the endotracheal tube comprises a diameter in a range from 2 mm to 12 mm.

8. A method of securely fastening an endotracheal tube to a user, the method comprising:
    providing a device comprising:
        a frame comprising a radial tracking portion; and
        an adjustable locking mechanism slidably connected to the radial tracking portion, the adjustable locking mechanism comprising:
            a swivel lock portion comprising a rotatable lever comprising a protrusion couplable with a gap of the radial tracking portion, wherein rotation of the rotatable lever rotates the protrusion of the swivel lock portion into the gap of the radial tracking portion to lock the adjustable locking mechanism relative to the frame; and
            an adjustable clip couplable to the swivel lock portion, wherein the adjustable clip is configured to secure and retain the endotracheal tube, wherein the adjustable clip comprises a tip portion and at least one surface comprising a plurality of teeth, wherein the tip portion is configured to couple with the plurality of teeth so as to fixedly secure the endotracheal tube to the adjustable clip;

securing the frame comprising the radial tracking portion about a head of the user;

sliding the adjustable locking mechanism along the radial tracking portion to a desired location; and locking the endotracheal tube in place using the adjustable locking mechanism.

9. The method of claim 8, wherein the desired location is proximate the user's mouth, such that the endotracheal tube can be inserted into the user's mouth.

* * * * *